United States Patent [19]
Illian

[11] 3,812,426
[45] May 21, 1974

[54] METHOD AND APPARATUS TO TEST ELECTRONIC CIRCUIT ASSEMBLY SAMPLES

[76] Inventor: Ludwig Wilhelm Illian, Goethestrasse 2, Dortelweil, Germany

[22] Filed: Apr. 27, 1972

[21] Appl. No.: 247,969

[30] Foreign Application Priority Data
Apr. 30, 1971 Germany.................. 2121330

[52] U.S. Cl.................. 324/73 R, 235/153 AC
[51] Int. Cl.......................... G01r 15/12
[58] Field of Search.......... 235/153 AC; 324/73 AT, 324/73 PC, 73 R, 158 R, 51

[56] References Cited
UNITED STATES PATENTS

| | | | |
|---|---|---|---|
| 3,614,608 | 10/1971 | Giedd................... | 324/73 R |
| 3,546,582 | 12/1970 | Barnard et al.......... | 324/73 AT |
| 3,471,778 | 10/1969 | Bennett et al.......... | 324/51 |

OTHER PUBLICATIONS
Cargile, W., "A Computer–Controlled System for Testing Digital Logic Modules," Hewlett–Packard Journal, March 1969, pp. 14–20.

Primary Examiner—Alfred E. Smith
Assistant Examiner—Rolf Hille
Attorney, Agent, or Firm—Flynn & Frishauf

[57] ABSTRACT

Electronic circuit assemblies having numbered terminals, some of which are input terminals and some are output terminals, are introduced into a test apparatus; a code combination of a predetermined program is applied to selected ones of the input terminals over an intermediate storage device and a connecting matrix. The outputs from at least some of the output terminals of the test sample are compared with outputs from a standard test sequence, or a sample of known quality, and an indication is obtained, upon non-coincidence, of the particular program step stored in the intermediate storage means which caused erroneous read-out. The input terminals are preferably grouped in groups of n terminals each, the connecting matrix permitting use of a code generator of a lesser number of outputs than the terminals of the sample. If the sample contains devices which may be in random states (such as flip-flops, counters or the like) circuits may be provided to re-set the devices to a predetermined state to effect comparison.

23 Claims, 13 Drawing Figures

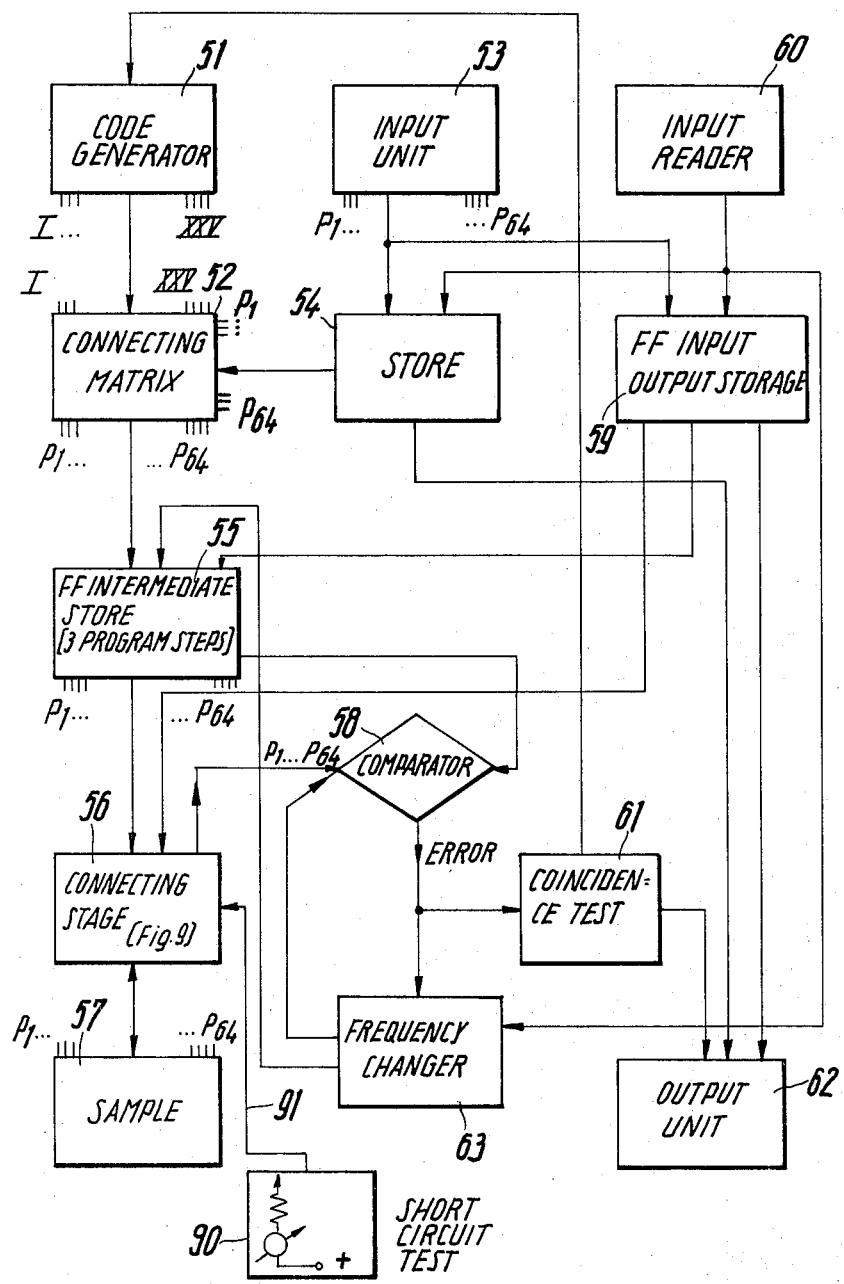

OUTPUT FROM CODEGENERATOR

| INPUT GROUPS | I | II | III | IV | V....XXV |
|---|---|---|---|---|---|
| a | $P_{15}$ | $P_{16}$ | $P_7$ | $P_8$ | |
| b | $P_{14}$ | $P_5$ | $P_{13}$ | — | |
| c | $P_3$ | $P_4$ | — | — | |
| d | $P_9$ | $P_2$ | $P_{12}$ | — | |

*Fig. 2*

OUTPUT FROM CODEGENERATOR

| 2ⁿ PROGRAMMING STEPS | I | II | III | IV | V | VI....XXV |
|---|---|---|---|---|---|---|
| 1 | 0 | L | L | 0 | L | 0 |
| 2 | L | L | L | 0 | L | 0 |
| 3 | 0 | 0 | 0 | L | L | 0 |
| 4 | L | 0 | 0 | L | L | 0 |

| STORE 55 | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_{14}$ | $P_{15}$ | $P_{16}$ | $P_{17}$ | $P_{18}$ | $P_{19}$ | $P_{20}$ | $P_{21}$...$P_{64}$ |
|---|---|---|---|---|---|---|---|---|---|---|---|---|---|---|---|---|---|---|---|---|---|
| FIRST STORED STEP | L | 0 | L | L | | L | 0 | 0 | | | L | L | 0 | 0 | L | | | | | | |
| OUTPUTS | A | | | | A | | | | A | A | | | | | | A | A | A | A | A | |

*Fig. 5*

| | | | | | | | | | | | | | | | | | | | | | |
|---|---|---|---|---|---|---|---|---|---|---|---|---|---|---|---|---|---|---|---|---|---|
| FIRST STORED STEP - INPUT | | L | 0 | L | L | | L | 0 | 0 | | | L | L | 0 | 0 | L | | | | | |
| FIRST STORED STEP - OUTPUT | L | | | | | 0 | | | | 0 | 0 | | | | | | L | L | L | L | 0 | |

Fig. 7

| TERMINAL NO P | 1 | 2 | 3 | 4 | 5 | 6 | 7 | 8 | 9 | 10 | 11 | COMPARISON | RESULT |
|---|---|---|---|---|---|---|---|---|---|---|---|---|---|
| INPUT OUTPUT  A |  |  | x | x |  |  | x |  |  | x | x |  |  |
| RANDOM COMBINATION AK UPON CONNECTION OF SAMPLE a |  |  | 0 |  | L |  | 0 |  |  | L | 0 |  |  |
| RANDOM COMBINATION BK UPON CONNECTION OF SAMPLE b |  |  | L |  | 0 |  | 0 |  |  | L | 0 | YES | UNEQUAL |
| INPUT OF CK PULSE COMBINATION |  |  | L | 0 | 0 | L | L | 0 |  | L | 0 | YES | UNEQUAL |
|  |  |  | 0 |  | L |  | 0 |  |  | L | 0 | YES | UNEQUAL |

Fig. 8

| TERMINAL NO P | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| INPUT AP STEP 26 | 0 | L |  | L | L |  | 0 | 0 |  | L | 0 | 0 | L |  | L | 0 |
| OUTPUT |  |  | 0 |  |  | 0 |  |  | L |  |  |  |  | 0 |  |  |
| INPUT BP STEP 26f | 0 | L |  | L | L |  | 0 | 0 |  | L | 0 | 0 | L |  | L | 0 |
| OUTPUT |  |  | 0 |  |  | L |  |  | L |  |  |  |  | 0 |  |  |
| INPUT CP STEP 26 SYNC. | 0 | L |  | L | L |  | 0 | 0 |  | L | 0 | 0 | L |  | L | 0 |
| OUTPUT |  |  | 0 |  | 0 |  | L |  | L |  |  |  |  | 0 |  |  |
|  |  |  | 0 |  |  |  |  |  |  |  |  |  |  | 0 |  |  |

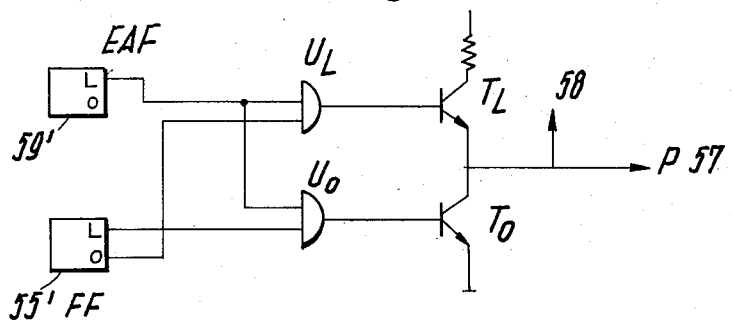
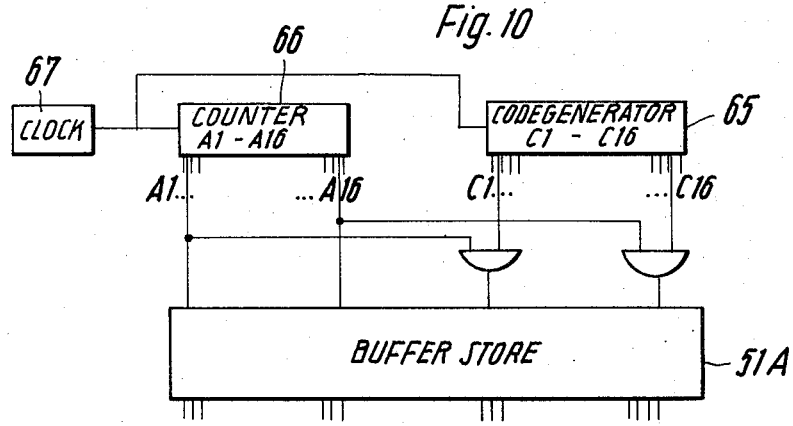
|  | I | II | III | IV | V | VI | ... XXV |
|---|---|---|---|---|---|---|---|
| 2 | L | L | L | 0 | L | 0 | |
| 2A | 0 | L | L | 0 | L | 0 | |
| 2B | 0 | 0 | L | 0 | L | 0 | |
| 2C | 0 | 0 | 0 | 0 | L | 0 | |
| 3 | 0 | 0 | 0 | L | L | 0 | |
PROGRAM STEP
Fig. 11

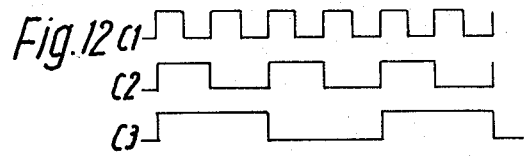
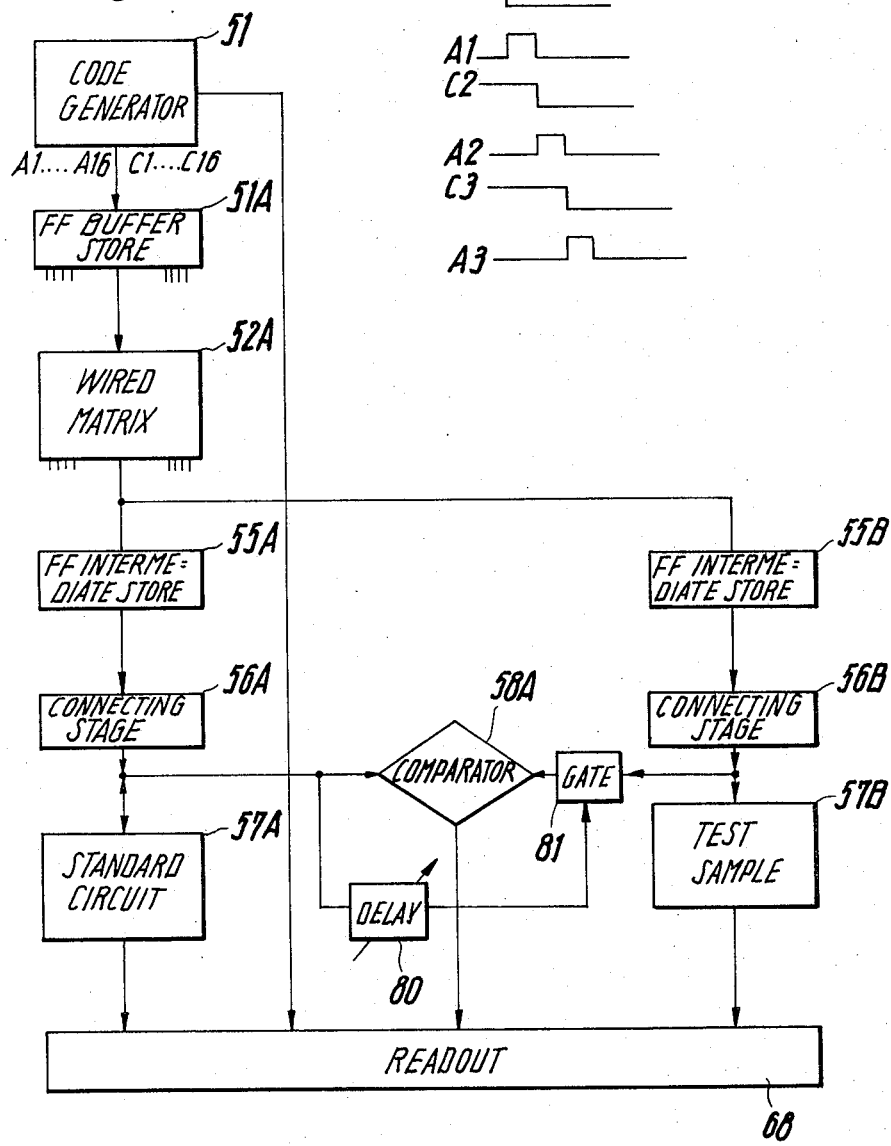

METHOD AND APPARATUS TO TEST ELECTRONIC CIRCUIT ASSEMBLY SAMPLES

The present invention relates to apparatus and methods to test samples of electrical and particularly electronic circuit assemblies, and especially to such apparatus and methods in which digitally operating electronic sub-circuits which have a large number of inputs and outputs can be tested for operability in accordance with their circuit design. The invention is applicable to test printed logic circuits, circuit boards for use in electronic calculators and other equipment, inserts or circuit board for miniaturized apparatus and the like, which have inputs and outputs appearing at terminal boards or terminal connectors, solder terminal, flags or the like, and which are designed to process digital pulses, in the following specification collectively referred to as "sample circuit assemblies" or similar.

To test sample circuits to detect whether they are free from errors, it has previously been proposed to provide special testing programs in the form of pulse groups, which are then applied to the inputs of the test sample, and to then sense the voltages or pulses at the outputs of the sample, and to indicate if these outputs are in accordance with design requirements or not.

The testing programs become complex and extensive in order to test samples which have a large number of active, or even passive circuit elements, and which have a large number of inputs and outputs. The writing of such test programs is time consuming and, although care is taken to test all possible combinations, and to test for all possible spurious responses or errors, it is difficult to determine if all conceivable and possible operating conditions have been covered by the program.

It is an object of the present invention to provide a method and a circuit arrangement in which all possible operating conditions of a sample can be tested in a comparatively simple manner, to reliably include a large number of input possibilities and, upon detecting of an error, not only to store the fact that an error has arisen but also to provide as much data as possible so that the analysis of the error can be simplified.

In accordance with another feature of the invention, the provision of a special testing program should be eliminated and the testing should be able to be carried out rapidly, so that a large number of similar test samples can be tested in short order; additionally, the method permits change from one type of test sample to another, having different circuit components, without extensive change in the apparatus or the method and to provide for optimizing the test process with respect to testing time, as well as with respect to storage time and storage capability of the equipment.

SUBJECT MATTER OF THE PRESENT INVENTION

Briefly, the test samples, having numbered terminals, are so arranged that the terminals are sub-divided into groups of at the most $n$ inputs. They are placed in a test apparatus which includes a connecting matrix and an intermediate storage device. A code generator provides $2^n$ code combinations at a predetermined clock frequency. The code combinations are applied, preferably in parallel, over the connecting matrix to the intermediate storage as well as to the inputs of the test samples. The pulse combinations arising at the inputs as well as at the outputs of the test samples are compared with pulse combinations representative of an error-free sample; these pulse combinations can be obtained either by simultaneously applying the pulses to a known standard, of known error-free quality, or by comparison with stored pulses; alternatively, the outputs from the test sample can be stored for later processing. Upon detection of non-coicidence of the outputs from the test sample with standard outputs, an indication is given not only of the non-coincidence, but also of the code combination which was applied to the test sample, and stored in the intermediate storage device, to facilitate trouble shooting on the test sample.

The use of a code generator which provides all possible $2^n$ code combinations permits application of all pulse combinations which could possibly occur to the test sample.

Each individual testing step requires testing time which depends on the number of the outputs of the code generator and the operating frequency, that is, the test frequency of the test apparatus (which, of course, is related to the clock rate of the code generator). Preferably, the number of outputs of the code generator should not be greater than 25 ($n \leq 25$) if the operating frequency is 1 MHz. If all possible combinations are run off at that clock rate, a time of approximately 32 seconds will be obtained for each sample. This is quite economical. If the code generator has 30 outputs, the time would increase substantially, that is, approximately to 20 minutes, which is uneconomical. By combining, in accordance with the invention, a number of inputs of the test sample into groups of at the most $n$ inputs (although the total number of inputs on the test sample may much exceed the value of $n$) test times which can be practically carried out are obtained. In order to accept possible errors or defects in the samples which might still arise, it is possible to test each sample twice, and to use for the second test sequence a different combination of inputs in the groups which form the $n$ input groups than that in the first. From a statistical point of view, practically all possible errors can thereby be detected and, in accordance with the invention, then indicated.

As an example of proceeding in accordance with the invention, the first impulse combination may be applied, as described, to the sample. The corresponding output pulse combination is then obtained and stored, for example, in a short or long-term storage; one example of storage would be in a punched tape, or other read-out device. The output is preferably stored together with the particular input combination which resulted in the specific output. In a preferred form, the code generator outputs should be applied in a manner, so that their pulses being free of intersections of their sloping flanks of their pulses; if pulse shaping is necessary, pulse shaping circuits may have to be used. After applying the first pulse combination, the next input pulse combination, together with the resulting output pulses are again stored, for example in the same punched tape. To decrease the number of the combinations to be stored, it may be desirable in certain embodiments to store only the output pulse combinations from the test samples when the output combination changes with respect to the next preceding output. This would require an additional short-term storage — that is, storage for one sampling step only.

The coded generator and the sample are interconnected by means of a connecting matrix. This connecting matrix enables grouping of $m$ inputs of the test sample into groups of at the most $n$ inputs, in which $n$ is less than $m$. The first input of each input group can be connected with one output, for example output I of the code generator. The second input of each group of terminals can be connected to the output II of the code generator. Alternatively, all $n$ outputs of the code generator may be connected to the $n$ inputs of a group of the sample. It could happen, however, that the grouping has been undesirably chosen so that a specific input terminal is undesirable in a certain group of inputs, with respect to the outputs of the code generator, so that the number of the various output combinations to be stored becomes too high. It may thus be desirable to change the sequencing of the numbers assigned to the input terminals within an input group, and their relationship to the $n$ outputs of the code generator until a minimum number of pulse combinations is obtained at the outputs of the sample when all $2^n$ code combinations are applied to the input. This testing, and arranging for a minimum number of pulse combinations is preferably carried out upon testing of the very first sample to obtain the real testing program, so that the subsequent test samples can be tested in a minimum period of time. This repetitive sequencing of testing is particularly desirable when a large number of similar samples have to be tested.

The output pulse combinations obtained on a storage device, such as a punched tape, or magnetic tape or the like, can be utilized to test other test samples of a similar type and in a simplified apparatus which does not include a code generator, a connecting matrix, and an input code keyboard but which rather directly carries out a comparison upon applying a certain coded input to a sample. Thus, one apparatus can be utilized as a master to determine input coding, and derive output coding (from a circuit which is known to be error-free), and similar coding can be used in a simplified apparatus for similar other samples.

If the samples include components which are themselves controlled by pulses, such as counters, flip-flops, chains of flip-flops and the like and which do not have a definite start position, then it is preferred to utilize a special synchronizing step to synchronize the inputs of the sample upon starting. This synchronizing step provides specially prepared pulse groups or pulse combinations which set the test sample in a predetermined state, so that all test samples will start from the same state.

If an error or mistake in output is descovered by noncoincidence detection of the output, for example if a printed circuit, or a component thereof is defective, then the particular combinations of coded pulses applied to the input, as well as the output are indicated. In accordance with a preferred form of the invention, the circuit is then forcibly synchronized to obtain proper output anyway. Let it be assumed that the error is caused by a flip-flop being set in a state which, in the entire subsequent coding would provide wrong outputs, all inputs and outputs of the logic of the printed circuit are synchronized after detection of an error, as if the error had not occurred, so as to be in step again with the sequence of testing, and to provide correct outputs subsequently, and as if the error which was discovered had not occurred.

In the ordinary course of testing, it is preferred to check the output impulse combinations of the sample roughly in the center of the step of a combination input pulse code being applied thereto in order to reduce the influences of transit times, capacitative charges, etc. as much as possible. For some test samples which process data particularly rapidly, the check of the output pulses can be carried out already earlier, for example during the first quarter of the particular clock pulse of the input code being applied; if the test sample operates slowly, the test may be carried out at a later time, for example in the last quarter of any one programming step. It is thus desirable to make the exact sampling time adjustable with respect to the time duration of the input pulses.

The stepping frequency of the input pulse generator can be extended up to 1 MHz or higher, depending on the samples, and primarily is limited or determined by the frequencies with which the sample is intended to operate, that is, for which it is designed. If the sample includes components which operate only slowly, then the stepping frequency is preferably chosen to be less.

Before carrying out the sampling by pulses, it may be desirable to first test the sample for short circuits so that currents which might be dangerous to the pulse generator can be avoided and, additionally, so that short circuit currents within the sample can be determined.

To indicate the errors within the sample, and to analyze these errors, the input and output pulse combinations during which the error arose should be indicated. The error can sometimes be found easier if also the last preceding correct step is indicated, as well as the next step of the combination which is to be applied to the sample. These specifically indicated test steps can be applied to a read-out device, for further consideration by the test operator.

The apparatus to carry out the method, in accordance with a feature of the present invention, is so made that a test sample having $n$ inputs receives these inputs, preferably in parallel, over an intermediate storage device and the connecting matrix from a code generator having $n$ outputs, the code generator providing $2^n$ pulse combinations. The outputs of the test sample are applied to a comparator which has a further input to which pulses are applied representative of error-free samples. A storage device is provided on which the impulse combinations, representative of codes, are stored if the output pulse combinations differ from a preceding output pulse combination, or if non-coincidence is determined in the comparator.

The invention will be described by way of example with reference to the accompanying drawings, wherein:

FIG. 1 is an overall schematic block diagram of the present invention;

FIG. 2 is a table illustrating allocation of input terminal groups of the sample to the outputs of the code generator;

FIG. 3 is a table illustrating program steps in connection with the outputs of the code generator;

FIG. 4 is a table illustrating storage of a combination step in the intermediate storage device;

FIG. 5 illustrates an input program step and the associated output program step;

FIG. 7 is a diagram illustrating start synchronization;

FIG. 8 is a diagram illustrating forced, or clamped synchronization;

FIG. 9 is a schematic, abbreviated circuit diagram of the interconnection of a test sample;

FIG. 10 is one representative form of a code generator;

FIG. 11 is a table similar to table 3 and illustrating modified steps;

FIG. 12 is a timing diagram showing output pulses from the code generator; and

FIG. 13 is a block circuit diagram of a further and simplified form of the present invention.

Figure 6:
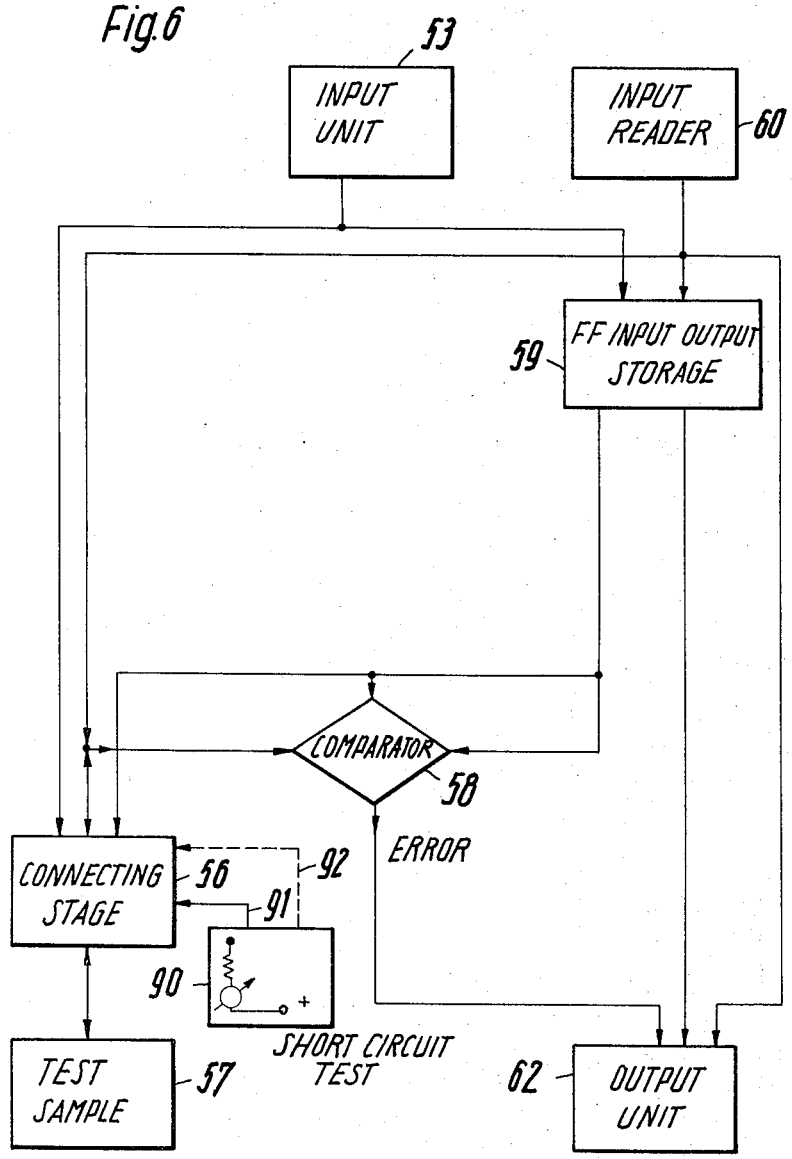
FIG. 6 is a block circuit diagram of a simplified embodiment.

The code generator 51 has $n$ outputs; in the example $n = 25$, and the outputs are indicated by Roman numbers I–XXV. The outputs from the code generator 51 are connected to corresponding inputs I–XXV of a connecting matrix 52. An input unit, for example a keyboard 53 and having 64 keys is connected over lines P1 to P64 to an intermediate storage 54 and, over the storage 54, to the connecting matrix 52. Outputs P1 to P64 of the connecting matrix are connected to a flip-flop intermediate storage device 55 which can store only a restricted number of the codes representing sequential combinations, in steps, of the code generator; a suitable number is, for example, three program steps. A connecting stage 56 for the sample circuit 57 is connected to the output of the intermediate store 55. The circuit of connecting stage 56 is shown in greater detail in FIG. 9 and will be described below. The test sample, in the present example assumed to have 64 pins, is connected with all 64 pins to the connecting stage 56. The input, as well as the output lines, on which output pulse combinations can arise, are connected to a comparator 58. The 64 outputs of the intermediate store 55 are likewise connected to the comparator 58. Comparator 58 may thus, additionally, function as an input-output storage device. Comparator 58 receives the information as to which one of the connecting terminals P1 to P64 of the sample are an input, or an output from data fed thereto by input unit 53, or an auxiliary input such as a punched tape reader, a magnetic tape reader, or the like, schematically shown at 60. The output of comparator 58 is connected to a circuit 61 to determine errors, that is, to determine coincidence of input and output pulses to comparator 58. Circuit 61, which tests for coincidence, is connected to an output unit 62, may be a punch tape, or punch card punch, a printer, or other output unit; it may be similar to input reader 60 or, in some installations, may be the same physical element used on a time-sharing basis. The reader 60 is additionally connected to a frequency change unit 63, the output of which is connected to comparator 58 and to intermediate store 55. An input-output storage device, such as a flip-flop register or the like and schematically indicated at 59 is connected to the input reader 60 and acts as a transfer register for connection of the input from reader 60 to the intermediate store 55, to the output unit 62 and to the comparator 58.

Operation: First, a sample is selected which is known to be free from errors. Those numbered connection terminals P1 to P64 which, in the circuit of the sample, form inputs are determined and, singly or in groups, the numbers of these terminals are entered into the entire device by the input unit 53. In the example to be discussed, the input terminals are grouped into groups $a$ to $d$, of maximal 25 inputs each. The number of the groups can be as desired, but cannot be greater than the number of all the connecting terminals, in the present example 64.

FIG. 2 illustrates four input groups $a$ to $d$ which, in order to simplify the example, are associated with only four outputs I – IV of the code generator. In the example, input group $a$ has assigned thereto inputs P15, P16, P7 and P8; the input group $b$ has assigned thereto inputs P14, P5, and P13; the input $c$ has assigned thereto the inputs P3 and P4; and input group $d$ has assigned thereto inputs P9, P2 and P12. In the initial state, that is, until the code generator provides outputs, the first input of each of the input groups $a$–$d$ (in accordance with FIG. 2: P15, P14, P3, P9) is connected with the output I of the code generator; the second inputs of each group $a$ to $d$, that is, the inputs P16, P5, P4, P2, are connected with the output II etc., as seen in the table of FIG. 2. The code generator will supply at its outputs I–XXV pulse groups, or combinations of pulses, respectively, which change from step to step, that is, which are counted in binary progression. In the first combination step, illustrated in FIG. 3 in the first horizontal line, an output pulse combination of OL-LOLO is provided; the second step provides the then next binary counted combination LLLOLO (in which L represents a ONE). If the first line of FIG. 3 is compared with the table of FIG. 2, then it will be seen that the terminals P15, P14, P3 and P9 each will have a O applied; the terminals P16, P5, P4 and P2 each will have a L applied thereto. The connecting matrix connects the pulse combinations to the intermediate store 55 as seen in the diagram of FIG. 4, for the first pulse combination. The terminals P1, P6, P10, P11, P17, P18, P19, P20, P21 will be disignated as output terminals (in FIG. 4: A) and are treated as such by the testing device since they have not been designated as input terminals (compare FIG. 2). For each pulse combination to the input, the sample will provide an output combination. Let it be assumed that for the particular circuit, and for the first step of the code generator, the output combination will be as indicated in FIG. 5. After two or more complete programming sequences are run through, the necessarily recurring output pulse combination will then represent the correct combination, which can be stored.

Each new pulse combination applied by the pulse generator provides a new programming step. Three sequential pulse combinations are stored in the intermediate store 55. The sample 57 connected to the connecting stage 56 will generate, over the comparator 58, an output read-out or print-out obtained from output unit 62, which contains the correct output combination. The connection of one of the 64 connecting terminals of the sample 57 is illustrated in FIG. 9 to which reference is now made.

The flip-flop intermediate store 55 stores pulses L and O to be applied to the connecting terminals of the sample 57. Only one such storage stage 55' is shown in FIG. 9.

The outputs of flip-flop 55' are connected to AND-gates $U_O$ and $U_L$. The outputs of the AND-gates are connected over transistors $T_L$ and $T_O$ to the appropriate connecting terminal P of the test sample 57. The determination whether the AND-gate $U_O$ or $U_L$ should be conductive, or not, is determined by an EAF input-output flip-flop 59'. The flip-flop 59' stores, for each terminal (in the present example there would be 64 such flip-flops for 64 terminals) the information whether the particular numbered terminal of the sample is an input to the sample, or is an output from the sample.

Operation of circuit of FIG. 9: The transfer table of the AND-gates $U_O$ and $U_L$ are as follows:

a. both inputs positive, "L:" output positive: "L"
b. any one input negative, "O;" output negative, "O."

If terminal P of sample 57 is an output, no potential may be applied thereto, that is, both transistors $T_O$ and $T_L$ must be non-conductive or, in other words, must be blocked. Flip-flop 59' is not set to a "L;" the inputs of the AND-gates $U_O$ and $U_L$, connected to the EAF flip-flop 59' are thus "O;" the outputs of the AND-gates $U_O$ and $U_L$ thus will have 0 potential, and transistors $T_O$ and $T_L$ are non-conductive. Connecting terminal P is at high potential. If the connection terminal P is an input to the sample, then this information is stored in accordance with the corresponding key in keyboard 53 and transferred to the EAF flip-flop 59'. The EAF flip-flop 59' changes state to "L," and the corresponding AND-gates become positive.

If the connecting terminal P, in accordance with a program step, should now conduct a "O," then FF 55' remains in "O" state. The "L" output is positive, and the "O" output has zero potential. Thus, the AND-gate $U_O$ has its condition fulfilled and becomes conductive. As the output from gate $U_O$ becomes positive, transistor $T_O$ becomes conductive and connects zero potential to the terminal P. Transistor $T_L$ remains blocked.

If the connecting terminal P, in accordance with a program, should have L potential, then this condition is again stored in the flip-flop 55'. Flip-flip 55' changes state so that the O-output becomes positive, and the L-output reverts to zero potential. This causes the AND-gate $U_L$ to become conductive, and transistor $T_L$ becomes conductive, and terminal P receives the desired "L" potential. Transistor $T_O$ remains blocked.

Reverting again to FIG. 1, after a test program has been determined by use of a standard sample, that is, a sample known to be error-free, the test samples can then be tested for quality of the electronic circuitry. The input and output signals derived from the standard sample were recorded in the output unit 62; this record, for example in form of a punched tape, magnetic tape, punched cards or the like is then introduced into the input reader 60. A test sample 57 is connected to the connecting stage 56. The code generator 51 is started. The code generator will, in rapid sequence, apply the pulse combinations thereof to the test sample 57. The output combinations from the test sample are compared in comparator 58 with the pulse combinations from the standard sample which previously had been supplied the same pulse combinations. The pulse combinations read by input reader 60 are stored in the flip-flop input-output storage 59; individual steps are stored in the intermediate store 55, for application therefrom to the comparator 58. If there is coincidence, then the next step of the program is connected from the code generator. In case of non-coincidence, however, an error will be sensed and the further test program is interrupted. The specific pulse combination applied to the test sample 57, as well as the preceding program step (that is, the pulse combination applied to the test sample and the read-out) and the subsequent program step are taken from the intermediate or buffer storage 55 and read out in a read-out device; the error can further be printed out on a printer, such as in output unit 62. The programmed combination, that is the steps taken from the intermediate or buffer storage 55 can also be recorded in a punched tape, magnetic tape or the like which is associated by coding with the sampling circuit so that further testing, to analyze the exact defect within the sample circuit can be obtained.

Rather than obtaining a read-out from output unit 62 and feeding this read-out the input reader 60, a standard sample can be left in the apparatus and the pulses applied from the code generator can be applied to the same standard sample, and the output pulses from the standard and from the sampling circuit 57 compared.

If it is desired to test a large number of similar test samples but at various test stations or locations, a simplified apparatus, shown in FIG. 6, can be used, in combination with a record which has been made once of the pulse codes to be applied to the test sample, and correct outputs which should be received therefrom. The apparatus of FIG. 6 is not capable of preparing the program of the pulse codes, nor of making of the record; it is a test apparatus in which a record prepared on the apparatus of FIG. 1, for example, can be used. Those parts which are similar have been given the same reference numeral and will not be described again. The input reader 60 reads the tape which provides the pulse sequence to be applied to the connecting stage 56 and then to the test sample. This pulse sequence is first stored in input-output storage unit 59 and applied to unit 56 which provides output pulses which are applied to the comparator 58. Comparator 58 likewise has output from the storage unit 59 applied thereto. In case of non-coincidence, an error signal is applied to output unit 62, which will, further, have applied thereto the next preceding code which resulted in a correct output, the code which resulted in an incorrect output, the incorrect output itself and the next succeeding code which would be applied — in other words the input-output storage unit 59 can function additionally as the intermediate store or buffer 55. The input unit 53 is not strictly necessary in this configuration, but may be desirable to provide at the output unit a coded or printed identification of the particular sample being tested so that, if output unit 62 is a printer, a print-out indicating the particular sample being tested, together with the test result can be obtained.

Some test samples include logic circuits which do not have a specific output combination, that is, provide a definite output. Such circuits are, for example, binary counters without automatic or forced re-set to zero; flip-flop chains, or the like. If a test sample which includes such binary counters or chains is connected to stage 56, then the outputs derived from the connecting stage may be random outputs dependent on the particular state the various counters or stages of the unit happen to be in as the test starts. Referring to FIG. 7, let it be assumed that outputs A3, A5, A9 and A10 are significant terminals in a binary counter. A separate input, such as terminal P7, is defined as a start synchronizing terminal. Upon energization of terminal P7, let it be assumed that the random combination AK will arise at the terminals A3, A5, A9 and A10. This is indicated in FIG. 7 in the second horizontal line AK, the outputs A3, A5, A9 and A10 having the pulses OLLO associated therewith.

If further test samples are connected to the apparatus, random output combinations may arise therein. A second such test sample may have the random combination BK of FIG. 7, third line, which shows pulses LOLO. The apparatus will compare this output combination sequence with the stored combination AK of the test sample. If there is no coincidence, then the apparatus will apply over the associated inputs, for example input P7, new code combinations to the test sample until the start combination will occur at the outputs A3, A5, A9 and A10, as indicated in the fourth line of FIG. 7. This only occurs when the input is the CK pulse combination OLLO. The real testing will proceed only when this start pulse combination is present.

Forced or clamped synchronization can also be carried out in accordance with a feature of the invention, after an error arose, to continue testing in spite of a single discovered mistake. The steps are illustrated in FIG. 8. Let it be assumed that the testing proceeded in order, that is, with no inconsistencies discovered by the comparator 58 up to step 26. The pulse combination stored in the intermediate or buffer store 55 is indicated in line AP for the programming step 26, related to the terminals of the sample where shown. Let it be further assumed that there is a mistake, or error in the test sample such that a flip-flop is incorrectly set (or reset), and having an output at output terminal P6. Instead of the value O, the code combination indicated in line PB (third line) of FIG. 8 will then result, so that the output at terminal P6 will be an L rather than a O, so that the output, as seen in the lower portion of the second row will be O L L O. If the flip-flop would remain in the state, which is erroneous, that is, if the terminal P6 will keep the value L, then the next programming step, and possibly also further subsequent programming steps may all be erroneous. To prevent this result, all outputs are switched to inputs for a short period of time, so that the test sample will be clamped to the correct output pulse combination. This switching, which may be termed forced or clamped synchronization forces the flip-flop into the correct state. In the foregoing example, as seen in the lowest line of FIG. 8, the pulse code combination O O L O will result, which corresponds to the correct output from programming step 26.

The apparatus can be changed over to many changes in output combinations. As described above, it is desirable to change the sequencing of the input terminals P1 to P64 within an input group, and their relationship to the outputs I to XXV of the code generator until a minimum of different pulse combinations is obtained at the outputs of the test sample when all $2^n$ code combinations are fed thereto, that is, until an optimum test sequence is obtained. This optimum arises when the number of the various output combinations is reduced to a minimum. It is also possible, however, to so arrange the input codes that the output codes change as often as possible, by proceeding in the opposite way, and to obtain the opposite result. In order to facilitate a subsequent analysis of errors and faults in the test samples, it may be of advantage to obtain a maximum of different output combinations from the various inputs, since more data relative to the effect of errors or mistakes within the test sample will be obtained. This can be considered analogous to obtaining different output results from different given inputs when testing for a "black box" circuit, that is, to obtain more information relating to the contents thereof.

The operation of the code generator, described in connection with FIG. 3 is so determined that from one programming step to the next various outputs of the code generator can change simultaneously from one common logic state to another common logic state. For example, if one logic state has outputs of L L L at program step No. 2, program step No. 3 will then change the output to O O O. Undefinable, and not determined conditions may arise within the test samples if, upon such radical change of the input code, the pulses within different circuit components of the test samples are subjected to different components and operating times, which may cause overlap of pulse flanks, or phase shifts within the sample. This may occur due to the operation of the re-set flip-flops within the normal type of code generator, or within the test samples. In order to prevent degradation of wave shapes, all code generator outputs are switched in a definite sequence, shifted by one working clock time. For example, in order to change from program step 2, FIG. 3, to program step 3 (FIG. 3) three further program steps 2A, 2B, and 2C are switched in. This is discussed in connection with FIG. 11.

The code generator is expanded to the generator unit illustrated in greater detail in FIG. 10. The code generator 65 which may, in this example, have sixteen outputs C1 to C16 has a counter 66 with outputs A1 to A16 associated therewith. The counter 66 as well as the code generator 65 are controlled by a clock source 67. The outputs of the counter and of the code generator are connected over AND-gates to a buffer store 51A.

Operation: The counter 66, at each one of its counting stages, provides a pulse at one of its outputs, so that the sixteen outputs thereof will have sixteen sequentially occurring opening pulses A1 to A16 which are applied to the buffer store 51A and to the AND-gates. The timing is illustrated in FIG. 12, where the opening or control timing pulses A1, A2, A3 are illustrated in their timed sequence. The outputs of the code generator C1, C2, and C3 are also seen in FIG. 12. By combining pulses A1, A2, A3 with the pulses C1, C2, C3, as derived from the code generator, a shift of the trailing flank of the pulses C1, C2, C3 with respect to each other will occur so that one program step to the next cannot cause overlap of pulse flanks due to degradation of the pulses from the ideal shape as represented in FIG. 12. Thus, the programming step 2 is broken up into steps 2A, 2B, 2C before step 3 will occur, as seen in FIG. 11. The code generator unit of FIG. 9 has 32 outputs, A1 to A16 and C1 to C16. The outputs A1 to A16 provide auxiliary output for strobe pulses, clock pulses, shift pulses, or other pulses which may be useful in the test apparatus. The test sample can be tested by comparing outputs and inputs with similar outputs and inputs from a standard, the standard outputs and inputs having been recorded on a storage device such as a punch tape, magnetic tape or the like. If standard samples, of known error-free quality are always available, it is possible to carry out the testing of samples at all times by utilizing the known standard as a comparison right in the equipment. Thus, the intermediate step of first making a record of the proper, desired outputs, with which the outputs from the test samples are compared, can be avoided. Referring to FIG. 13, the circuit elements of FIG. 1 forming the input reader 60, input-output storage 59, coincidence test unit 61, output unit 62, and, if necessary, frequency changer 63 (all seen in FIG. 1) can be eliminated. In order to decrease costs, the connecting matrix 52 can be simplified. The code generator outputs are no longer applied to a universally operable programmable matrix, the outputs of which are determined from the input unit 53 or input reader 60 over an intermediate storage. Rather, the connecting matrix is formed as a wired program, or as a patch board, in the form of an XY distribution unit which distributes the outputs of the code generator. Of course, for each type of sample circuit to be tested, a separate and distinct pre-wired connecting matrix, or coupling or patch board will be necessary. The fixed distribution program then permits the elimination of the input or keyboard unit 53 and the store 54. Instead of the programmable connecting matrix, each test sample has a fixed program applied thereto as determined by the connecting matrix 52 which, as a fixed program, can then be termed a distribution matrix. This element, fixed in its program is seen in FIG. 13 at 52A. The buffer or intermediate storage 55 is practically split and so made that it stores only a single programming step, rather than the three programming steps of FIG. 1, as indicated by unit 55A, FIG. 13. An additional buffer storage device 51A is inserted, preferably, immediately behind the code generator in order to take over a portion of the function of the previous intermediate or buffer store 55. Code generator 51, having outputs A1....A16 and C1....C16 then connects directly to the first buffer storage 51A which, in turn, is connected over 32 lines to the fixed connecting distribution matrix 52A. The programming step necessary to carry out the comparison in comparator 58 is taken off the input to the buffer storage 55A and applied to a parallel buffer storage element 55B. The step in the program during which the comparison is made can thus be obtained from either one of the buffer storage devices 55A, 55B; the buffer store 51A will hold the next subsequent programming step; the code generator itself can be used if the second subsequent programming step is to be read out.

The buffer storage devices 55A, 55B are connected to similar connecting stages 56A, 56B which, in turn, connect to a standard circuit 57A and a test sample circuit 57B, respectively. Read-out unit 68 indicates the result of the comparison carried out in comparator 58A; if desired, read-out unit 68 can simultaneously also print out the outputs derived from both the standard circuit and the test sample, as well as the particular sequence of pulses derived from the code generator, or subsequent sequences to be derived from the code generator.

If the circuit arrangement of the test sample is such that the terminals which are not switched will automatically have a high potential, that is a L-potential, then it is sufficient if the connecting stage 56, indicated in detail in FIG. 9, switches only zero potentials. If necessary, a suitable load resistance may be used with the test sample, as a separate connectable element to any one of the circuits. Referring again to FIG. 9, the AND-gates $U_0$ and $U_L$ can then be dispensed with, as well as transistor $T_L$. Programming and storing of input-output information is greatly simplified since only zero potentials have to be indicated. Each terminal connected to the code generator automatically becomes an input. In order to further simplify the apparatus and save components, the position of the code generator at any one instant of time is preferably indicated by the read-out equipment 68, for example by luminous displays or the like. This read-out then can give a visual indication of the code, of threshold levels, and of the errors, if any, which may arise. The code generator of FIG. 13 had 32 outputs A1–A16 and C1–C16, in accordance with FIG. 10. The test samples again may have sixty-four outputs, as in the example of FIG. 1.

The timing of the comparison of output pulses from the test sample, and standard pulses should be variable in order to allow for degradation of the pulses from the test sample, due to the circuit components contained therein. FIG. 13 illustrates a suitable circuit. If the test sample 57B, for example, contains circuit elements which operate only slowly, such as a plurality of capacitances, then the forward or leading flank of the standard pulse is sensed in a delay circuit 80, and the delayed flank applied to a gate 81, so that the read-out from the test sample 57B being applied to the comparator will occur at a later period during any one pulse duration, or step of the code generator, that is, at a time when the pulses from the test sample are already well established and do not show slowly ascending leading edges, which are difficult to sense and interpret, and difficult to be compared in a comparator. The delay time of delay 80 is adjustable to accomodate various types of test samples, that is, test samples having operating times which may vary from slow to fast, so that the instant of sensing of the output pulses from the test sample, that is, the instant of comparison within any one pulse period, can be controlled. In effect, gate 81 selects a time slot within a pulse period which is narrower than the entire pulse period, and opens the gate (which may be in form of a rapidly acting AND-gate) to sample or strobe the output pulse from test sample 57B at a predetermined instant of time within the entire pulse period.

Before testing the entire circuit sample, it is desirable to subject the circuit sample to a short circuit test. Referring to FIG. 6, where such a short-circuit test is schematically indicated, a short circuit test unit 90 is provided which, in its simplest form, may be no more but a source of potential which is preferably somewhat greater than the highest to be expected or to be used by the test sample, and selectively and sequentially applied over line 91 to the various terminals of the test sample. If a short circuit is detected, by indication of the indicator within the short circuit test unit, an interlock line 92 blocks application of input pulses from reader 60 or input unit 53 to the connecting stage. The connecting stage 56 is preferably so wired that, before any test of a test sample 57 can be carried out, the short circuit test must first be completed satisfactorily, indicating no short circuit. This can be accomplished easily by known interlocks, by incorporating a relay into the short circuit test unit 90 which inhibits opening of connecting stage 56 over control line 92, or the like.

Of course, the short circuit test unit 90 can be used with all the embodiments discussed, both in connection with FIG. 1, FIG. 6 and FIG. 13; likewise, the time slot allocation effected by delay unit 80 and gate 81 may be used in any of the embodiments.

Various changes and modifications may be made within the inventive concept.

I claim:
1. Method to test sample electronic circuit assemblies having a plurality of numbered electrically accessible terminals which form input and output terminals therefor, comprising
combining the numbered terminals of the samples which form input terminals into groups of not more than $n$ terminals;
connecting said groups of not more than $n$ terminals in a connecting matrix so as to be fed in parallel with signals supplied on n input terminals of said matrix;
generating $2^n$ code combinations on $n$ leads in a predetermined program and at a predetermined clock rate;
applying to and storing the $2^n$ code combinations in an intermediate storage means and applying the $2^n$ code combinations over the connecting matrix to the terminals of the inputs of the sample;
comparing the pulses applied to the input terminals and comparing the pulses appearing at the output terminals of said sample with a standard pulse combination sequence;
and testing for coincidence between the standard pulse combination sequence and the pulse combination sequence appearing at the output terminals of the sample and indicating, upon detection of non-coincidence, the pulse code combination temporarily stored in the intermediate storage means giving rise to the output resulting in noncoincidence.

2. Method according to claim 1, comprising the step of simultaneously applying the $2^n$ code pulse combinations to a standard circuit assembly and to a test sample circuit;
wherein the step of comparing the standard pulse combination sequences with the pulses appearing at the input and output of the sample comprises comparing the input and output pulses from the standard circuit with the pulses from the test sample.

3. Method according to claim 1, including the steps of
a. changing the relative order of the numbered terminals in the groups of $n$ terminals and thus the application of pulses from predetermined outputs of the code generator to some individual input terminals of the sample;
b. counting the number of different combinations of output terminal pulses being stored;
repeating the steps (a) and (b) with a variety of terminal groupings and selecting for further tests the grouping producing the lowest number of different output combinations.

4. Method according to claim 1, comprising the step of applying to the sample a test synchronizing signal before application of the $2^n$ code combinations to set circuit elements in the sample which do not have a defined input state into a synchronized predetermined state.

5. Method according to claim 1, wherein prior to application of said $2^n$ code combinations a start synchronizing signal is applied comprising
a pulse train or group of pulses to set a combination of circuit elements in the sample in a predetermined combination of states.

6. Method according to claim 1, further comprising the step of first testing the sample for input and output short-circuit paths, and inhibiting application of code combinations to the sample which may generate short circuit currents.

7. Method according to claim 1, including the step of indicating, besides the code combination representative of non-coincidence, the pulse code combination within the program which last yielded coincidence.

8. Method according to claim 1, including the step of indicating, besides the code combination representative of non-coincidence, the pulse code combination within the program which the code generator would next apply to the sample test.

9. Method according to claim 7, including storing the pulse code combination which still yielded coincidence and applying said stored coincidence combination and the non-coincident combination to an error analyzer.

10. Method according to claim 8, including the step of indicating, besides the code combination representative of non-coincidence, the pulse code combination within the program which last yielded coincident output.

11. Method according to claim 1, wherein the sequence of steps is repeated with the step of connecting the groups of $n$ terminals over the connecting matrix to the pulse generator including a preliminary step of changing the interconnection circuit of the numbered terminals within the groups by changing the interconnecting circuit configuration of the connecting matrix to provide for different interconnection of the code generator with numbered input terminals, in groups, of the sample.

12. Test apparatus to test assembled electronic circuit samples,
the circuit samples having a plurality of numbered electrically accessible terminals to form input and output terminals for the circuit samples, comprising
a code generator (51) generating a code sequence of $2^n$ pulses in a predetermined program;
an intermediate storage device (55);
a connecting matrix (52);
a comparator (58);
wherein the code generator (51) has a lesser number $n$ of output terminals (I, II...XXV) than the terminals of the sample (1, 2...64) and the input terminals of the samples are grouped in groups of not more than n terminals each, and the connecting matrix connects said $n$ output terminals in parallel to the terminals of said groups, the code generator and the input terminal groups being interconnected over the intermediate storage device (55) as well as over the connecting matrix (52);
the output of the sample (57) being connected to one input of the comparator (58);
means generating a standard comparison pulse code representative of the output pulses which should be obtained from the output of the sample (57) if the sample is free from defects or errors, said standard comparison code being connected to the other input of the comparator (58);
and means (61, 62; 68) responsive to the output of the comparator indicating noncoincidence of the pulses derived from the output of the sample and the corresponding standard comparison code.

13. Apparatus according to claim 12, wherein the means generating the standard comparison pulse code comprises a standard circuit assembly known to be error free;

means applying said code sequence from the code generator (51) to said standard circuit assembly;

and means connected to the output terminals thereof, and receiving the outputs from said standard sample for applying them to said comparator.

14. Apparatus according to claim 12, wherein the means generating a standard comparison pulse code comprises;

means (60) for reading the stored representation of output pulses obtained from a standard comparison circuit known to be error free and supplying therefrom a pulse sequence for application to said comparator.

15. Apparatus according to claim 12, further comprising controllable input means (53) connected to the connecting matrix, the controllable input means setting the transfer circuits of the connecting matrix to determine the interconnection between the respective outputs (I, II...XXV) of the code generator (51) to the sample (P1, ....P64).

16. Apparatus according to claim 15, wherein the controllable input means contorls the interconnecting paths of the connecting matrix from the code generator to selected inputs within the groups of input terminals of the sample.

17. Apparatus according to claim 12, including a short circuit test unit (90)

connectable to selected terminals of the test sample (57) to permit testing of the sample for short circuit condition, and means (92) inhibiting application of pulses to the sample if the short circuit test indicates presence of a short circuit.

18. Apparatus according to claim 12, further comprising a connecting circuit interconnecting the test sample (57) with the connecting matrix (52) and the intermediate storage device (55), the connecting circuit comprising controllable circuit means ($U_L$; $U_O$; $T_L$; $T_O$) for preventing energization of certain terminals of said sample by pulses produced by said code generator.

19. Apparatus according to claim 12, further comprising output control means (67; 66) interconnected between the code generator (65) and the test sample (57), said output control means inhibiting change of output pulse from the code generator at more than one output terminal of the code generator, at any one time.

20. Apparatus according to claim 19, wherein the output control means comprises a counter (66) sequentially opening the output terminals of the code generator, in timed stepped sequence, and controlling the timing of transfer of output pulses from the code generator by strobing the output pulses thereof;

and buffer storage means (51A) storing the strobed output pulses, to provide intermediate programming steps and prevent change of more than one output from the code generator at any one pulse period.

21. Apparatus as claimed in claim 12, wherein the connecting matrix comprises an X-Y interconnection array interconnecting selected output terminals (I, II...XXV) of the code generator (51) with selected terminals (P1, P2...P64) of the sample (57) with no two of said output terminals (I, II...XXV) being connected to the same selected terminals (P1, P2...P64) of the sample.

22. Apparatus according to claim 21, wherein the X-Y interconnection array is pre-wired.

23. Apparatus according to claim 21, wherein the X-Y interconnection array is programmable to provide for selectively changeable interconnection of the code generator (51) terminals with the sample (57) terminals.

* * * * *